US011504887B2

(12) United States Patent
Backues et al.

(10) Patent No.: US 11,504,887 B2
(45) Date of Patent: Nov. 22, 2022

(54) ROTATION UV CURE

(71) Applicant: THE BOEING COMPANY, Chicago, IL (US)

(72) Inventors: Jared Backues, O'Fallon, MO (US); Roger D. Bernhardt, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 141 days.

(21) Appl. No.: 16/597,217

(22) Filed: Oct. 9, 2019

(65) Prior Publication Data

US 2021/0107185 A1  Apr. 15, 2021

(51) Int. Cl.
| | | |
|---|---|---|
| *B29C 35/08* | (2006.01) | |
| *B29C 64/264* | (2017.01) | |
| *B29C 64/30* | (2017.01) | |
| *B33Y 40/00* | (2020.01) | |

(52) U.S. Cl.
CPC ........ *B29C 35/0805* (2013.01); *B29C 64/264* (2017.08); *B29C 64/30* (2017.08); *B33Y 40/00* (2014.12); *B29C 2035/0827* (2013.01)

(58) Field of Classification Search
CPC ........ B29C 2035/0827; B29C 35/0805; B29C 64/35; B29C 64/357; B29C 2045/0075; B29C 33/06; B29C 64/264; B29C 64/30; B29C 71/04; B33Y 40/00; B33Y 40/10; B33Y 40/20

See application file for complete search history.

(56) References Cited

U.S. PATENT DOCUMENTS

| | | | | |
|---|---|---|---|---|
| 2018/0178241 A1* | 6/2018 | Luo | ................... | B29C 71/0009 |
| 2020/0086568 A1* | 3/2020 | Wynne | ................. | B29C 64/135 |
| 2020/0324479 A1* | 10/2020 | Friedrich | ................ | B08B 3/104 |

FOREIGN PATENT DOCUMENTS

CN        108568969 A  *  9/2018

OTHER PUBLICATIONS

Machine translation for CN-108568969A, Sep. 2018.*
Derwent abstract for CN-108568969A, Sep. 2018.*

* cited by examiner

*Primary Examiner* — Philip C Tucker
*Assistant Examiner* — Jimmy R Smith, Jr.
(74) *Attorney, Agent, or Firm* — Marshall, Gerstein & Borun LLP

(57) ABSTRACT

A system for removing and evenly completing cure of residual collected uncured resin from within a 3D printed part, which includes an enclosure which shields UV electromagnetic radiation from entering a space positioned within the enclosure. The system further includes a rotator device positioned in the space within the enclosure and a 3D printed part positioned within the space and associated with the rotator device.

20 Claims, 8 Drawing Sheets

ROTATION UV CURE

FIELD

This disclosure relates to curing material and more particularly to curing additively manufactured parts.

BACKGROUND

Three dimensional ("3D") printing is often used to produce parts which are capable of being used directly for end-use purposes or being used for prototyping and wherein a high level of accuracy and resolution is required. One example of a 3D printing technique, which provides a high level of accuracy and resolution, includes stereolithography ("SLA"). SLA utilizes a photopolymer resin and Ultra Violet ("UV") radiation to cure the photopolymer resin in printing parts. The SLA printing process is often used in replacement of using injection molding for fabricating plastic parts.

In utilizing SLA printing, the fabricator can experience residual collected uncured photopolymer resin positioned within a cavity within the part being printed, which has not been cured in the printing process. The residual collected uncured resin is trapped within the cavity, such that the resin is not aligned with an opening in the cavity which is in fluid communication with the cavity and with an outside of the part. The fabricator will allow gravity, with the part in place, to act on the residual collected uncured resin trapped within the cavity, which is aligned with the opening, to drain through the opening. Any trapped remaining residual collected uncured resin material that has not drained out of the printed part is then cured. With curing of remaining collected uncured resin material, large uneven portions of cured resin material is formed in the finished part.

As a result there is a need to remove residual collected uncured resin trapped within voids within a printed part prior to the part becoming completed and avoid uneven cured portions of the finished printed part.

SUMMARY

An example includes a system for removing and evenly completing cure of residual collected uncured resin from within a 3D printed part, which includes an enclosure which shields UV electromagnetic radiation from entering a space positioned within the enclosure. The system further includes a rotator device positioned in the space within the enclosure and a 3D printed part positioned within the space and associated with the rotator device.

An example includes a method for removing and evenly completing cure of residual collected uncured resin from within a 3D printed part, which includes positioning of a rotator device and a 3D printed part associated with the rotator device within a space of an enclosure which shields UV electromagnetic radiation from entering the space.

The features, functions, and advantages that have been discussed can be achieved independently in various embodiments or may be combined in yet other embodiments further details of which can be seen with reference to the following description and drawings.

DESCRIPTION

In fabricating parts which often require a high level of accuracy and resolution, such as for end-use products or for prototypes, additive technology printing technology is used such as for example stereolithography ("SLA"). In using a printing technology such as SLA, residual photopolymer, which is not cured during the printing process, is often trapped and collected within cavities of the printed part. Without removal of the collected uncured resin from the part, prior to curing, the part can result in having large uneven portions of cured resin material being formed in the finished part. As a result, there is a need to remove the residual collected uncured resin before a final cure of the part takes place and to evenly cure the 3D printed part.

Figure 1:
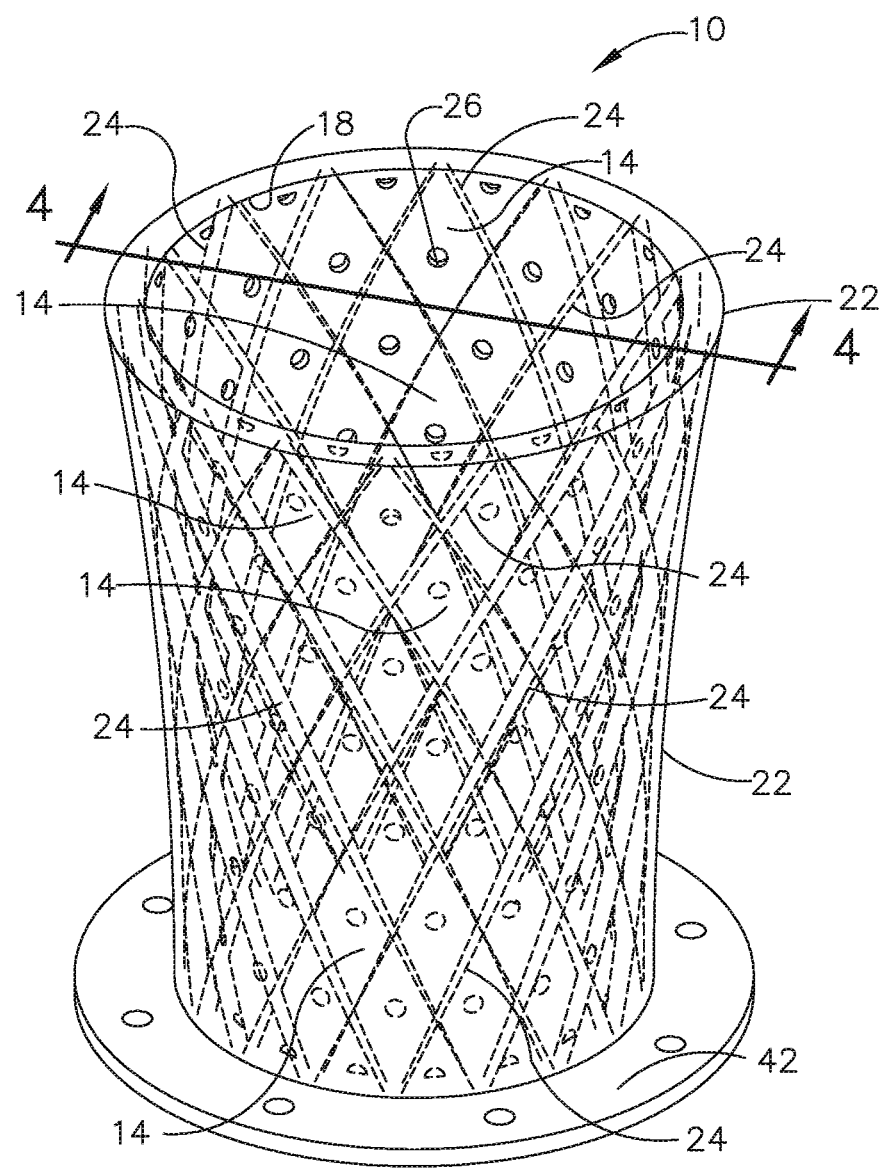
FIG. 1 is a perspective view of a 3D printed part with hidden lines showing at least one interior wall member positioned between spaced apart exterior wall members of the printed part, wherein the at least one interior wall member and the spaced apart exterior wall members form at least one cavity within the printed part, with an opening positioned which extends through one of the exterior wall members and is in fluid communication with the cavity and an outside of the 3D printed part.
Figure 9:
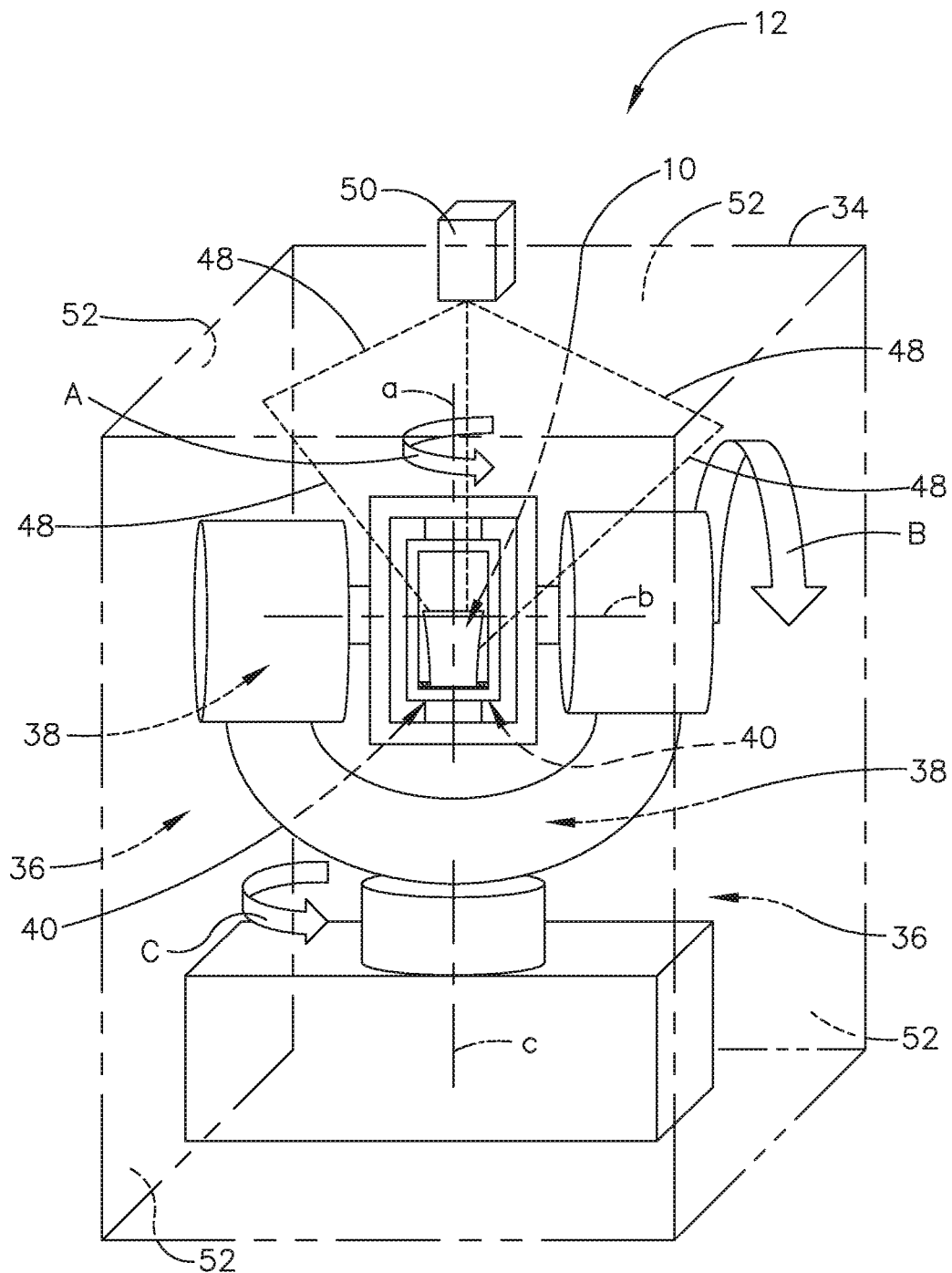
FIG. 9 is a perspective view of the 3D printed part secured to a rotator device, which rotates about three axes, wherein the 3D printed part and the rotator device are positioned within an enclosure, which shields UV radiation shown in phantom.

In referring to FIG. 1, an example of a 3D printed part 10 is shown, which has been printed, in this example, with a 3D printing process such as SLA. 3D printed part 10 is a finished part with employing system 12, as seen in FIG. 9, for removing and evenly completing cure of residual collected uncured resin from within 3D printed part 10, as will be discussed.

Figure 2:
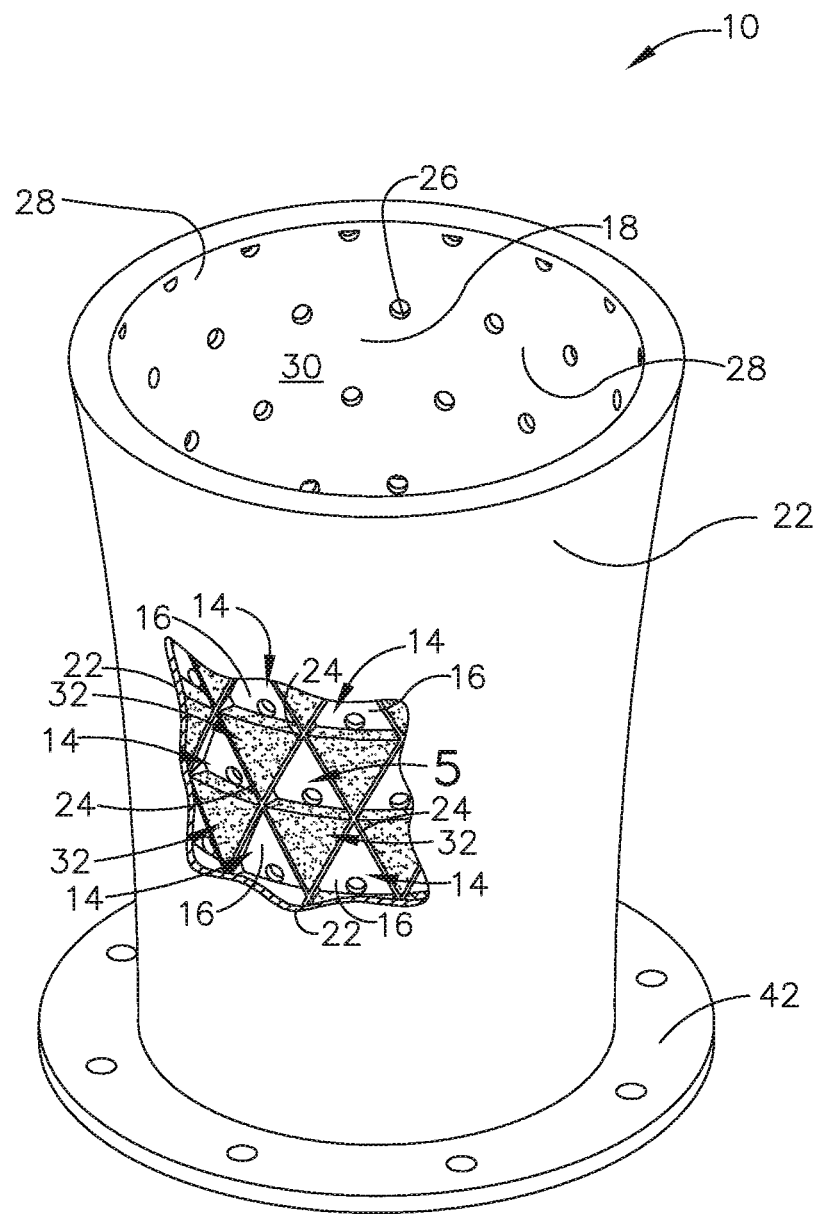
FIG. 2 is a partial broken away view of the 3D printed part of FIG. 1 with collected residual uncured resin positioned within at least one of the cavities of the printed part.
Figure 3:
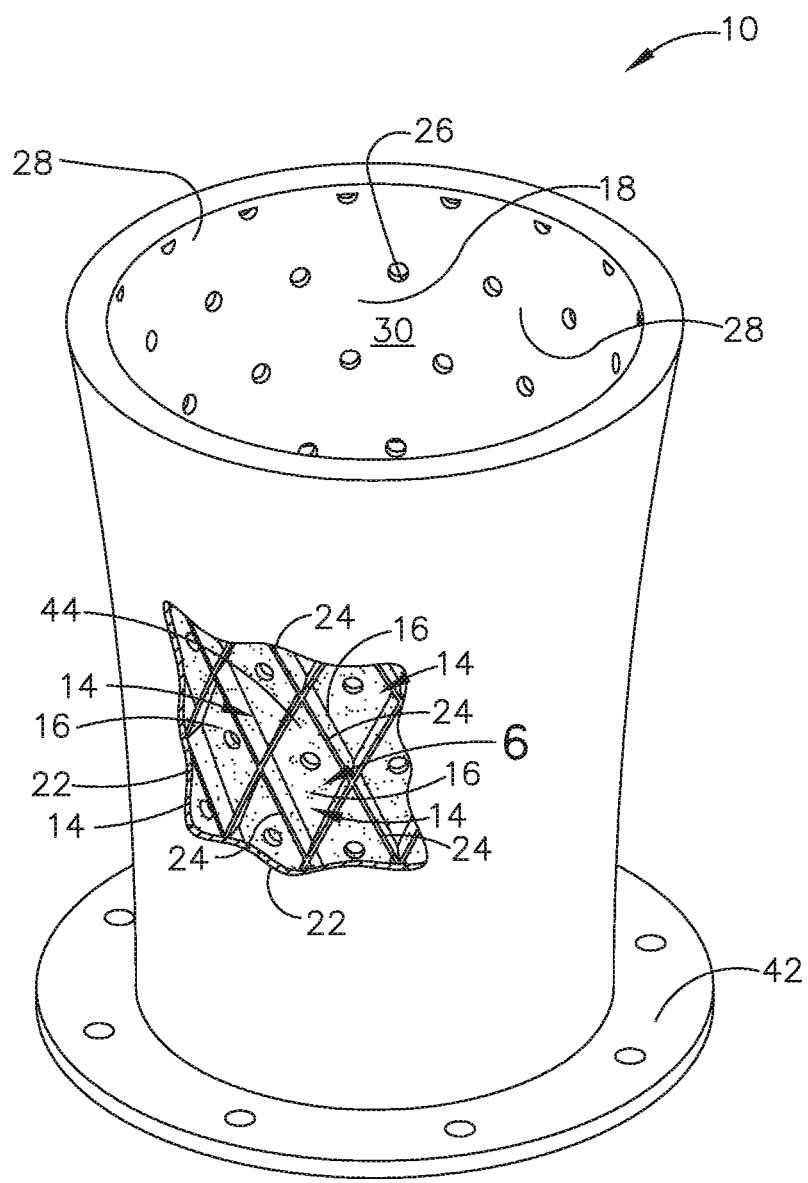
FIG. 3 is the 3D printed part of FIG. 2 in a finished condition.
Figure 4:
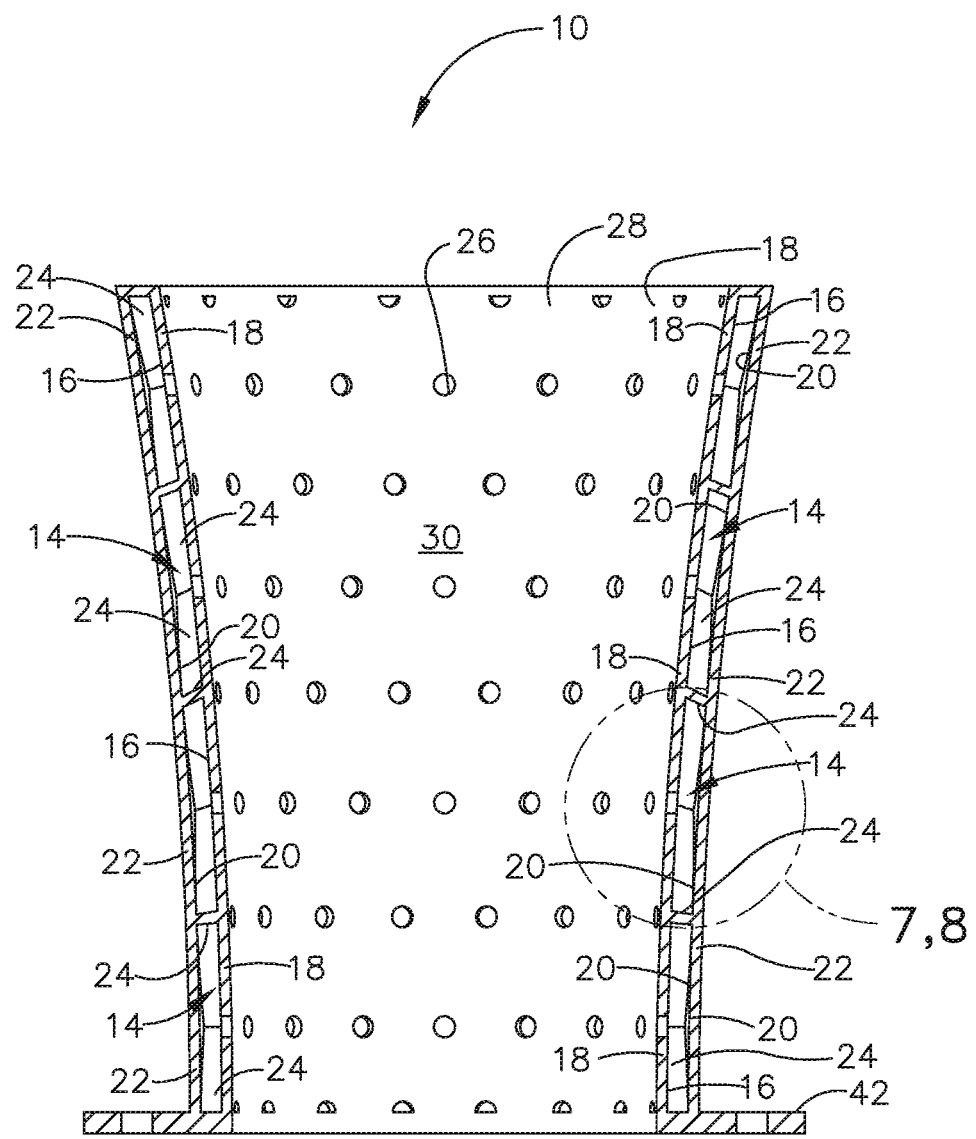
FIG. 4 is a cross section of the 3D printed part as seen along line 4-4 of FIG. 3.
Figure 8:
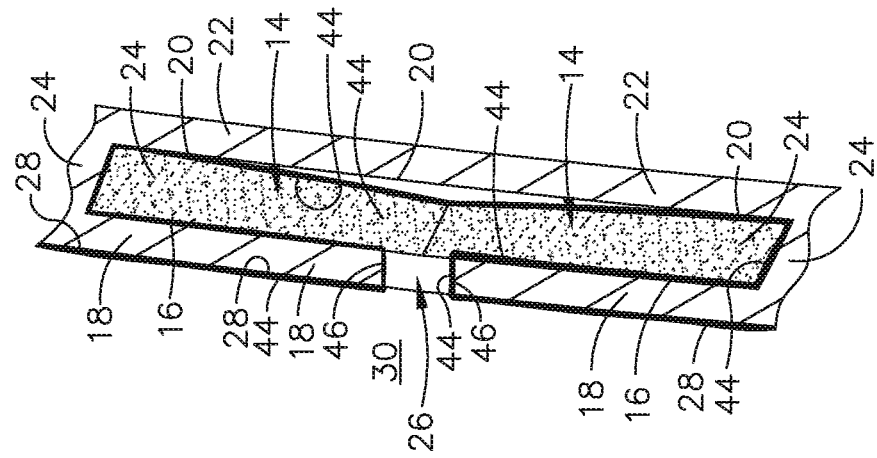
FIG. 8 is a cross section view designated as 8 in FIG. 4.
Figure 7:
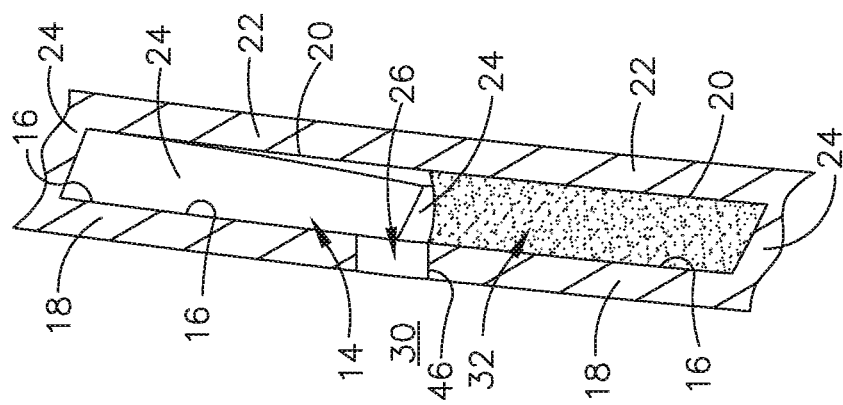
FIG. 7 is an enlarged cross section view designated as 7 in FIG. 4.

In referring to FIGS. 1-4, 7 and 8, 3D printed part 10 forms cavity 14, as described herein and, in this example, a plurality of cavities 14 are formed by and positioned within 3D printed part 10. Each cavity 14, as shown in this example, is bounded between interior surface 16 of first wall member 18 of 3D printed part 10 and interior surface 20 of second wall member 22 of 3D printed part 10, as seen in FIGS. Interior surface 16 of first wall member 18 and interior surface 20 of second wall member 22 are spaced apart from one another as seen in FIGS. 4, 7 and 8. Cavities 14 are each further bounded with the at least one wall member 24 which extends between interior surface 16 of first wall member 18 and interior surface 20 of second wall member 22, as seen in FIGS. 7 and 8. In this example, at least one wall member 24 includes four wall members forming a parallelogram or diamond shape between interior surface 16 of first wall member 18 and interior surface 20 of second wall member 22, which forms cavity 14. In printing parts, cavities within a part can be formed of any shape or configuration depending on the design for the particular part. Should an opening be positioned extending in fluid communication with the cavity and with an outside of the printed part, residual uncured resin collects inside the cavity and is trapped in the cavity during the printing process with the residual collected uncured resin positioned not in alignment with the opening and not having an opportunity to drain out of the cavity.

Figure 5:
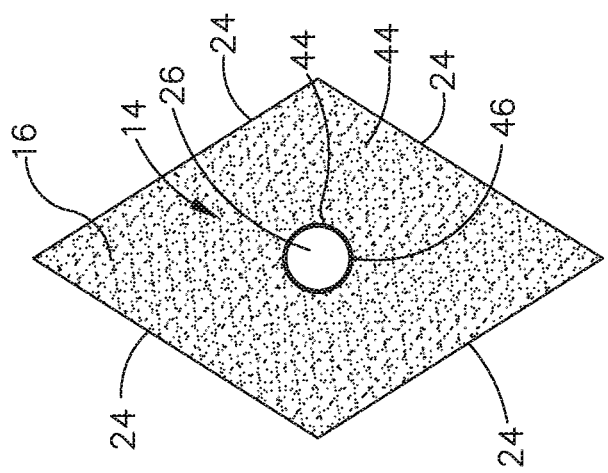
FIG. 5 is an enlarged side elevation view of a cavity designated as 5 in FIG. 2.

In the present example, 3D printed part 10 defines opening 26 which extends from exterior surface 28 of 3D printed part 10 into 3D printed part 10. Opening 26 extends within 3D printed part 10 to cavity 14 formed by and positioned within 3D printed part 10 as described above for this example. Cavity 14 is in fluid communication with opening 26, such that a fluid and/or gas would pass between cavity 14 and opening 26 and in this example from cavity 14 and through opening 26 and similarly opening 26 is in fluid communication with an exterior 30 of 3D printed part 10. In this example, cavity 14 contains residual collected uncured resin 32, as seen in FIGS. 2, 5 and 7, from 3D printing of 3D printed part 10. Residual collected uncured resin 32 which is not aligned with opening 26 so as to provide gravity an opportunity to drain residual collected uncured resin 32 from cavity 14, residual collected uncured resin 32 remains trapped within cavity 14 as seen in FIGS. 2, 5 and 7.

In order to prevent residual collected uncured resin 32 from being cured within 3D printed part 10 and creating an uneven portion of 3D printed part 10 when 3D printed part 10 is finally cured, system 12 for removing and evenly completing cure of residual collected uncured resin from within a part which has been 3D printed, as seen in FIG. 9, is used. System 12 includes enclosure 34 which shields UV electromagnetic radiation from entering space 36 positioned within enclosure 34. System 12 further includes rotator device 38 positioned in space 36 within enclosure 34. Included in system 12 is 3D printed part 10 positioned within space 36 and associated with rotator device 38.

In system 12, in this example, 3D printed part 10, after having been printed, is positioned within enclosure 34 and secured to rotator device 38. In this example, printed part 10 has residual collected uncured resin 32 trapped within cavities 14, such as seen in FIGS. 2, 5 and 7. Rotator device 38 includes a clamp mechanism 40, shown schematically in FIG. 9, for securing of 3D printed part 10 to rotator device 38. Prior to securing of 3D printed part 10 to rotator device 38, 3D printed part 10 is rinsed with a solvent such as alcohol, which lessens the viscosity of uncured resin present on or within 3D printed part 10. This rinsing allows resin that can flow off of or out of from within 3D printed part 10 to do so and leaves resin that remains on or within 3D printed part 10 less viscous and facilitates flow of the resin.

In this example, 3D printed part 10 includes a portion 42, as seen in FIGS. 1-4, which extends from 3D printed part 10 and is configured as an annular collar extending about 3D printed part 10. Portion 42 can be one of many configurations that permit securing of 3D printed part 10 to rotator device 38. Once the rinsing of printed part 10 has occurred, portion 42 is engaged by clamp mechanism 40 securing of 3D printed part 10 to rotator device 38. Rotator device 38 includes three axes of rotation a, b and c, as seen in FIG. 9. Rotation arrows A, B and C represent rotation about axis a, b and c, respectively. With 3D printed part 10 secured to rotator device 38 and positioned within enclosure 34, which does not permit UV radiation into space 36, rotator device 38 rotates 3D printed part 10 about the three axes a, b and c. The rotation of 3D printed part 10 about the various axes a, b and c exerts an apparent force (centrifugal), on collected residual uncured resin 32 within each cavity 14, in a direction away from each axis of rotation. The movement gives residual collected uncured resin 32 the opportunity to move out of cavity 14, through opening 26 to exterior 30 related to 3D printed part 10.

Figure 6:
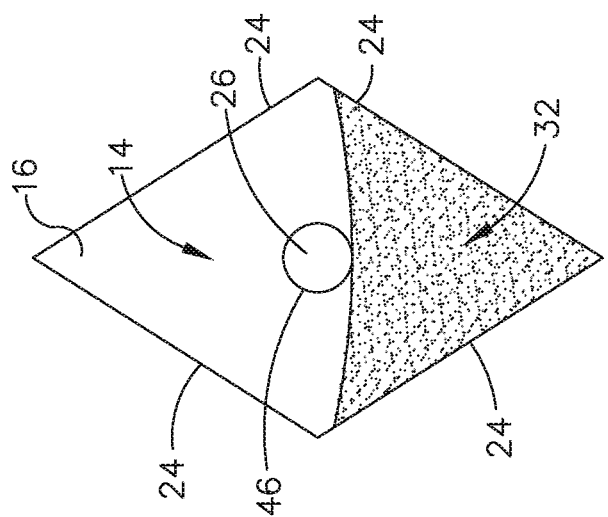
FIG. 6 is an enlarged side elevation view of a cavity designated as 6 in FIG. 3.

With the movement of the rotator device 38, residual collected uncured resin 32 is removed from cavities 14 and whatever resin which may remain associated with 3D printed part 10 is left on 3D printed part 10 as a light smooth coating of uncured resin 44 as seen in FIGS. 3, 6 and 8 for example also as speckled surfaces. Residual collected uncured resin 32, as seen in FIGS. 2 and 7 is no longer residing in a collected form within cavity 14 and has been expelled out of 3D printed part 10 through opening 26, with in some cases as shown in this example, leaves a light smooth coating of uncured resin 44 positioned on one or more of at least one wall member 24, interior surfaces 16 and 20 of first wall member 18 and second wall member 22, respectively, on edge of opening 26 and on exterior surface 28, as seen in FIGS. 3, 6 and 8.

With residual collected uncured resin 32 removed from cavity 14 and with, in some instances as in this example, a light smooth coating of uncured resin 44 is distributed on 3D printed part 10 surfaces as described above. 3D printed part 10, in this example, is unclamped from rotator device 38 and rinsed similarly again, for a second time with a solvent and then again is secured to rotator device 38 within space 36 of enclosure 34.

3D printed part 10 is once again rotated, for a second time with rotator device 38 within enclosure 34 and is at that time exposed to UV electromagnetic radiation 48 from a source 50, which emits UV electromagnetic radiation 48 within space 36 of enclosure 34. In other examples, (not shown) two or more sources (not shown) for emitting UV electromagnetic radiation 48 within space 36 of enclosure 34, with each source (not shown) for emitting UV electromagnetic radiation 48 emitting from a different location relative to enclosure 34. In the present example, interior surface 52 of enclosure 34 includes a material which reflects UV electromagnetic radiation 48, which is emitted within space 36 of enclosure 34 and facilitates coverage of 3D printed part 10 with UV electromagnetic radiation 48 along with the rotation imparted to 3D printed part 10 by rotator device 38 in achieving finished curing of 3D printed part 10. This material for interior surface 52 can include one or more of a variety of reflective surfaces which may include polished metal, mirrors etc.

Figure 10:
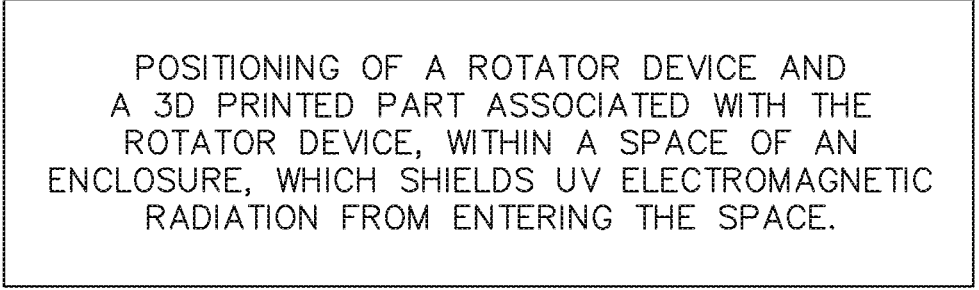
FIG. 10 is a flow chart of a method for removing and evenly completing cure of residual uncured resin from within a 3D printed part.

In referring to FIG. 10 method 54 for removing and evenly completing cure of residual collected uncured resin from within 3D printed part 10, is shown, which includes positioning 56 of rotator device 38 and 3D printed part 10 associated with rotator device 38 within space 36 of enclosure 34, which shields UV electromagnetic radiation from entering space 36. Method 54 further includes 3D printing of 3D printed part 10, such as for example with SLA as mentioned earlier, with 3D printed part 10 having, for example, cavity 14 within 3D printed part 10 and having opening 26 in 3D printed part 10. Cavity 14, as mentioned earlier, is in fluid communication with opening 26 and opening 26 is in fluid communication with exterior 30 of 3D printed part 10. Cavity 14 contains residual collected uncured resin 32, such as for example, a photopolymer used in 3D printing of 3D printed part 10, as seen in FIGS. 2, 5 and 7.

With 3D printed part 10 having been printed, 3D printed part 10 is rinsed with a solvent such as alcohol or other solvent that will work with reducing the viscosity of a photopolymer used in the 3D printing process of this example. After rinsing of 3D printed part 10 with a solvent, method 54 includes securing of 3D printed part 10 to rotator device 38. With 3D printed part 10 secured to rotator device 38, method 54 further includes rotating of 3D printed part 10 with rotator device 38 within space 36 of enclosure 34. In this example, rotator device 38 includes three axes of rotation a, b and c as described earlier around which 3D printed part 10 is rotated.

The rotation of 3D printed part 10 about the various axes a, b and c exerts an apparent force (centrifugal), on collected residual uncured resin 32 within each cavity 14, in a direction away from each axis of rotation. The movement gives residual collected uncured resin 32 the opportunity to move out of cavity 14, through opening 26 to exterior 30, related to 3D printed part 10. With the movement of the rotator device 38, collected residual uncured resin 32 is removed from cavities 14 and whatever resin which may remain associated with 3D printed part 10 is left on printed part 10 as a light smooth coating of uncured resin 44 as seen in FIGS. 3, 6 and 8 (as representatively shown as a speckled surface). Residual collected uncured resin 32, as seen in FIGS. 2 and 7, is no longer residing in a collected form within cavity 14 and has been expelled out of 3D printed part 10 through opening 26, with in some cases as shown in this example, leaves a light smooth coating of uncured resin 44 positioned on one or more of at least one wall member 24, interior surfaces 16 and 20 of first wall member 18 and second wall member 22, respectively, on edge of opening 26 and on exterior surface 28 of first wall member 18, as seen in FIGS. 3, 4 and 8.

With completion of rotation of 3D printed part 10 by rotator device 38, method 54 includes, in this example, rinsing of 3D printed part 10 with solvent as described earlier. With having completed rinsing of 3D printed part 10 with solvent, method 54 further includes in this example, rotating of 3D printed part with rotator device 38 within space 36 of enclosure 34 and exposing of 3D printed part 10 to UV electromagnetic radiation 48 within space 36 until uncured resin is cured.

While various embodiments have been described above, this disclosure is not intended to be limited thereto. Variations can be made to the disclosed embodiments that are still within the scope of the appended claims.

What is claimed:

1. A system for removing at least a portion of a residual uncured resin from a 3D printed part and for evenly curing a remaining portion of the residual uncured resin, the system comprising:
   an enclosure which shields UV electromagnetic radiation from entering a space positioned within the enclosure, wherein the enclosure has an interior surface made from a material which reflects UV electromagnetic radiation;
   a rotator device having three axes of rotation is positioned in the space within the enclosure, such that with the 3D printed part secured to the rotator device, a first rotation of the 3D printed part by the rotator device about the three axes of rotation removes the at least a portion of the residual uncured resin from the 3D printed part; and
   a source for emitting UV electromagnetic radiation is positioned within the space of the enclosure, for emitting UV electromagnetic radiation onto the 3D printed part for curing the remaining portion of the residual uncured resin during a second rotation of the 3D printed part about the three axes of rotation by the rotator device, which evenly cures the remaining portion of the residual uncured resin on the 3D printed part.

2. The system of claim 1, further includes two or more sources for emitting UV electromagnetic radiation positioned within the space of the enclosure, with each of the two or more sources for emitting UV electromagnetic radiation emitting from a different location within the enclosure.

3. The system of claim 1, wherein the rotator device further includes a clamp mechanism to secure the 3D printed part to the rotator device.

4. The system of claim 3, wherein the clamp mechanism engages a portion of the 3D printed part.

5. The system of claim 1, wherein the 3D printed part has an opening which extends from an exterior surface of the 3D printed part to a cavity of the 3D printed part.

6. The system of claim 5, wherein the cavity is bounded between an interior surface of a first wall member of the 3D printed part and an interior surface of a second wall member of the 3D printed part such that the interior surface of the first wall member and the interior surface of the second wall member are spaced apart from one another.

7. The system of claim 6, wherein the cavity is further bounded with an at least one wall member which extends between the interior surface of the first wall member and the interior surface of the second wall member.

8. The system of claim 1, wherein the 3D printed part is rinsed with a solvent prior to the first rotation, wherein the solvent comprises alcohol.

9. The system of claim 8, wherein with the 3D printed part having been rotated from the first rotation the 3D printed part is removed from the rotator device and rinsed a second time with the solvent.

10. The system of claim 9, wherein with the 3D printed part having been rinsed the second time with the solvent, the 3D printed part is secured to the rotator device with a clamp prior to the second rotation.

11. The system of claim 1, wherein the material of the interior surface of the enclosure comprises at least one of polished metal or mirrors.

12. A method for removing residual collected uncured resin trapped within a cavity of a 3D printed part, which has an opening in fluid communication with the cavity and with an exterior of the 3D printed part, the method comprising:
   rinsing the 3D printed part with a solvent; and
   positioning the 3D printed part in association with a rotator device positioned within a space of an enclosure, which shields UV electromagnetic radiation from entering the space.

13. The method of claim 12, wherein positioning the 3D part in association with the rotator device includes securing the 3D printed part to the rotator device.

14. The method of claim 13, wherein with the 3D printed part secured to the rotator device, further including rotating the 3D printed part with the rotator device within the space of the enclosure removing the residual collected uncured resin trapped in the cavity.

15. The method of claim 14, wherein with completion of rotation of the 3D printed part by the rotator device, further including rinsing the 3D printed part with the solvent for a second time.

16. The method of claim 15, wherein with having rinsed the 3D printed part with the solvent for the second time the rotator device rotates the 3D printed part for a second time within the space of the enclosure.

17. The method of claim 15, further includes while rotating the 3D printed part for a second time the 3D printed part is exposed to UV electromagnetic radiation from an UV electromagnetic source positioned within the enclosure.

18. The method of claim 17, with completion of the rotating of the 3D printed part for the second time, further including releasing the 3D printed part from the rotator device.

19. The method of claim 18, wherein the rotator device includes a clamp mechanism.

20. The method of claim 19, wherein releasing the 3D printed part from the rotator device includes unclamping the 3D printed part from the clamp mechanism.

\* \* \* \* \*